United States Patent
Chen et al.

(10) Patent No.: US 10,025,748 B2
(45) Date of Patent: Jul. 17, 2018

(54) LANE DIVISION MULTIPLEXING OF AN I/O LINK

(71) Applicant: Intel Corporation, Santa Clara, CA (US)

(72) Inventors: Huimin Chen, Portland, OR (US); Dennis M. Bell, Beaverton, OR (US); Robert A. Dunstan, Forest Grove, OR (US); Duane G. Quiet, Hillsboro, OR (US); Gary A. Solomon, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 900 days.

(21) Appl. No.: 14/040,421

(22) Filed: Sep. 27, 2013

(65) Prior Publication Data
US 2015/0095531 A1  Apr. 2, 2015

(51) Int. Cl.
*G06F 13/36* (2006.01)
*G06F 13/42* (2006.01)

(52) U.S. Cl.
CPC ...... *G06F 13/4282* (2013.01); *G06F 13/4265* (2013.01); *Y02D 10/14* (2018.01); *Y02D 10/151* (2018.01)

(58) Field of Classification Search
CPC ........ G06F 13/36; G06F 13/364; G06F 13/42; G06F 13/4247; G06F 13/4204; G06F 2213/00; H04L 12/40052
USPC .......................... 710/104–105, 110, 305–306
See application file for complete search history.

(56) References Cited

U.S. PATENT DOCUMENTS

| | | | |
|---|---|---|---|
| 4,534,011 A * | 8/1985 | Andrews | G06F 13/124 710/58 |
| 6,738,881 B1 * | 5/2004 | Ollivier | G06F 13/28 370/329 |
| 2005/0010712 A1 * | 1/2005 | Kim | G06F 13/404 710/315 |
| 2012/0044425 A1 | 2/2012 | Lee et al. | |
| 2013/0275635 A1 * | 10/2013 | Sip | G06F 13/382 710/105 |
| 2013/0290577 A1 * | 10/2013 | Fugate | G06F 13/4081 710/105 |
| 2013/0336334 A1 * | 12/2013 | Gilberts et al. | |

FOREIGN PATENT DOCUMENTS

| | | |
|---|---|---|
| CN | 102576339 A | 7/2012 |
| JP | 2009065643 A | 3/2009 |

\* cited by examiner

*Primary Examiner* — Tim T Vo
*Assistant Examiner* — Kim T Huynh
(74) *Attorney, Agent, or Firm* — International IP Law Group, P.L.L.C.

(57) ABSTRACT

A system can include a host device and a remote terminal. The host device can include a host terminal, the host terminal including a host configuration manager to allocate a data lane to an I/O protocol and a protocol multiplexer to carry out allocation of the data lane based on the allocation of the configuration manager. The remote terminal can include a remote configuration manager. The remote configuration manager is to communicate with the remote configuration manager via a control bus to detect connection of an I/O device to an I/O port and to allocate the data lane to the I/O protocol.

18 Claims, 6 Drawing Sheets

LANE DIVISION MULTIPLEXING OF AN I/O LINK

TECHNICAL FIELD

The present techniques relate generally to Input/Output (I/O) signaling protocols. In particular, the present techniques relate to multiplexing I/O protocols on data lanes.

BACKGROUND

Currently, input/output (I/O) devices are coupled to electronic devices for a variety of reasons, including transferring data, backing up data, etc. I/O devices include storage devices, keyboards, input devices such as mice, among others. In addition to a variety of I/O devices, each device relies on an I/O protocol for interacting with the electronic device to which the I/O device is coupled. These I/O protocols can include universal serial bus (USB), Display-Port (DP), peripheral component interconnect express (PCIe), and serial advance technology attachment (SATA), among others.

BRIEF DESCRIPTION OF THE DRAWINGS

Certain exemplary examples are described in the following detailed description and in reference to the drawings, in which.

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION OF SPECIFIC EMBODIMENTS

Figure 1:
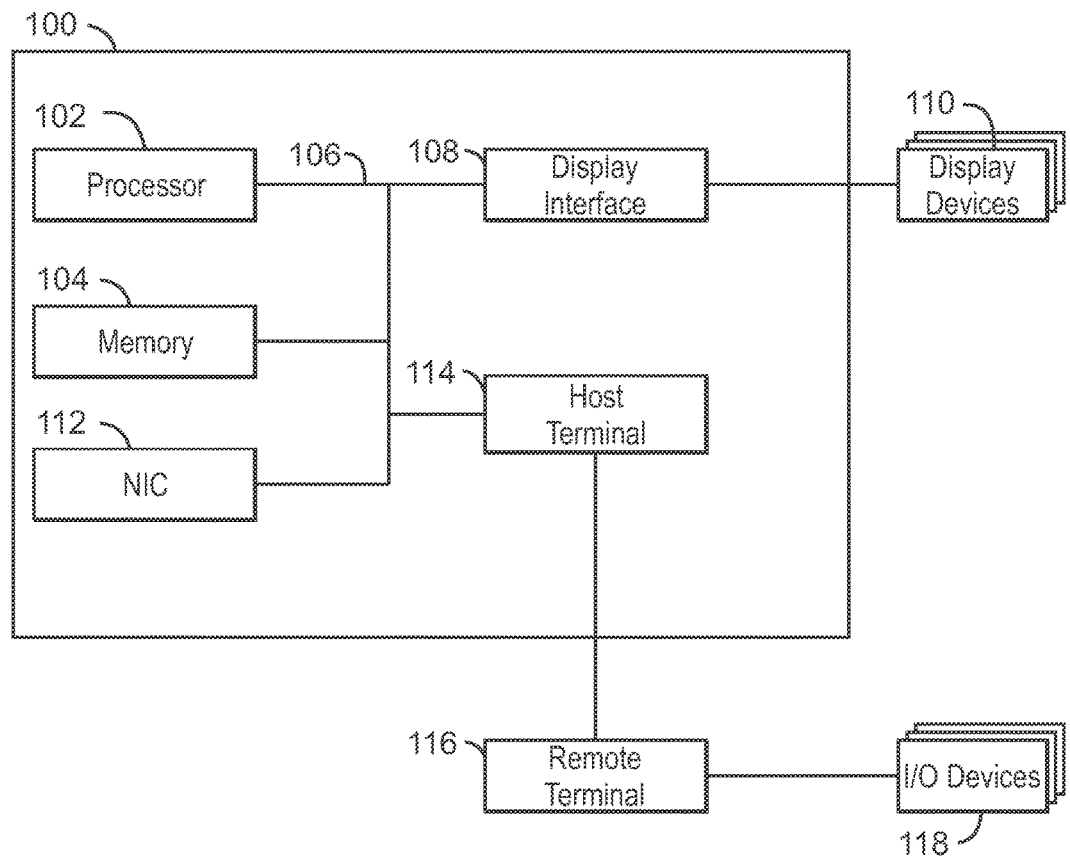
FIG. 1 is a block diagram of an example of a computing system.

Examples disclosed herein provide techniques for lane division multiplexing of an I/O link. Due to the growing types of I/O connections, electronic devices include increasingly large numbers of ports and supported I/O interfaces. To increase the number of supported I/O interfaces, some interconnects are capable of supporting multiple I/O protocols.

A single interconnect that supports multiple I/O protocols exists, in which traffic from host controllers is merged on a single bus, resulting in packetizing of the I/O protocols at the host level. In other words, it is a technology in which a transport protocol may be created. Different native I/O protocols are mapped to the transport protocol at the transmitting side, i.e., are bundled together into a single transport protocol to be transported over a single data lane, and are demapped back to native I/O protocols at the receiving side. This type of IO technology may utilize additional power to packetize the native I/O protocols into the transport protocol and to depacketize the native I/O protocols from the transport protocol. Additionally, because the native I/O protocols are bundled together, the protocols may not be individually power managed. Further, due to bundling of the native I/O protocols, the transport protocol is subject to timing concerns. For example, data transfer occurs at the speed of the slowest I/O protocol, not the quickest I/O protocol. Because of these timing concerns, delays can be introduced in the native I/O protocols.

Another example of a single interconnect supporting multiple I/O protocols is USB. USB is a technology that packetizes the I/O protocols at the device level. In other words, USB is a technology in which all of the supported protocols run on the same path and are separated by device drivers and scheduling. USB defines device classes for the devices and breaks down data transfers at that device level. However, USB is limited in the types of data and the amount of data that can be transferred at a time. In addition, USB is limited in reconfigurability. The USB protocol is optimized to work with at the device level, but is defined without tunneling non-USB protocols in mind.

The preceding examples both employ a concept of time division multiplexing (TDM), where each device shares the bandwidth in the time domain. In this application, a concept of lane division multiplexing (LDM) is presented. In LDM, an interconnect medium is formed with one or more unidirectional high-speed lanes in each direction, along with a bidirectional lane. Various I/O protocols are detected and allocated natively (i.e., preserving the characteristics of the I/O protocols) to specific lanes independently. I/O protocols are not combined electrically. This LDM method has several advantages over the existing solutions. In particular, because the native characteristics of the I/O protocols are preserved, the method is more robust than existing solutions. In addition, because no new protocol is introduced, no additional protocol processing in terms of mapping and demapping is needed, resulting in reduced die size, and lower power consumption. Additionally, the method is more efficient as high-speed protocols and low-speed protocols are able to operate at their respective speeds, without interference, because the protocols are not bundled. Further, the method is simple, not requiring the creation of a new protocol, mapping and demapping complexities, or bundling of I/O protocols, each of which have their own characteristics. The method can also be flexibly configured with different I/O protocols, depending on the connected I/O protocols. In addition, while the system and method are described herein as carrying electrical signals, the system and method are extensible to include other types of signals, such as optical signals.

FIG. 1 is a block diagram of an example of a computing system. The computing system can include an electronic device 100 (i.e., host device). The electronic device 100 may be virtually any type of electronic device including, for example and without limitation, a desktop computer, tablet computer, laptop computer, cellular phone, such as a smartphone, personal digital assistant (PDA), camera, television, video player or receiver, gaming console, and the like. The electronic device 100 can include a central processing unit (CPU) 102 to execute stored instructions, as well as a memory device 104 that stores instructions that are executable by the CPU 102. The CPU 102 can be coupled to the memory device 104 by a bus 106. Additionally, the CPU 102 can be a single core processor, a multi-core processor, or any number of other configurations. Furthermore, the electronic device 100 can include more than one CPU 102.

The memory device 104 can include random access memory (RAM), read only memory (ROM), flash memory, or any other suitable memory systems. For example, the memory device 104 can include dynamic random access memory (DRAM). The CPU 102 can be linked through the bus 106 to a display interface 108 to connect the electronic device 100 to a display device 110. The display device 110 can include a display screen that is a built-in component of the electronic device 100. The display device 110 can also include a computer monitor, television, or projector, among others, that is externally connected to the electronic device 100.

A network interface card (NIC) 112 can connect the electronic device 100 through the system bus 106 to a network (not depicted). The network (not depicted) can be a wide area network (WAN), local area network (LAN), or the Internet, among others. In an example, the electronic device 100 can connect to a network via a wired connection or a wireless connection.

The CPU 102 can also be coupled through the bus 106 to a host terminal 114. The host terminal 114 can be coupled to a remote terminal 116, which can be coupled to an I/O device or a plurality of I/O devices 118. The host terminal 114 and the remote terminal 116 can be coupled by a plurality of data lanes to transfer data from the I/O devices 118 to the electronic device 100. The plurality of data lanes can include any number of data lanes. The host terminal 114 and the remote terminal 116 can communicate via a control bus to allocate the data lanes to I/O protocols of the I/O devices 118. The control bus can be a uni-directional communication link or a bi-directional communication link. In an example, each data lane can be assigned a different I/O protocol. The number of lanes assigned to each I/O protocol can be determined based on the data rates of which the I/O devices are capable and the number of lanes to support these data rates.

It is to be understood the block diagram of FIG. 1 is not intended to indicate that the computing system 100 is to include all of the components shown in FIG. 1 in every case. Further, any number of additional components can be included within the computing system 100, depending on the details of the specific implementation.

Figure 2:
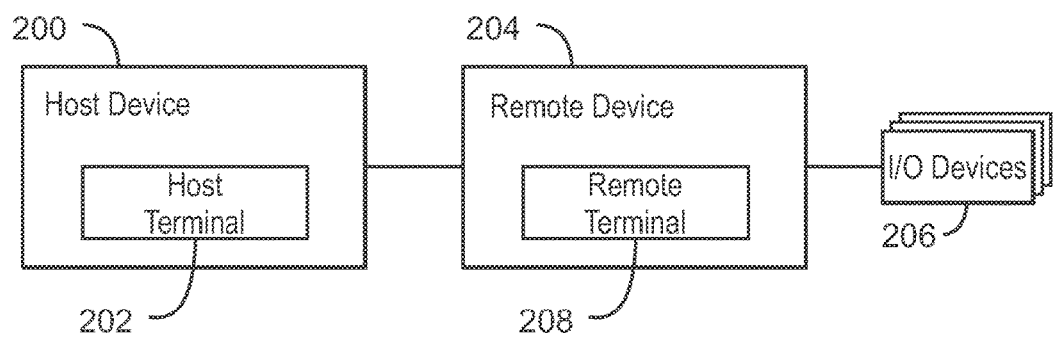
FIG. 2 is a block diagram of an example of another computing system.

FIG. 2 is a block diagram of an example of another computing system. The host device 200 can be any type of electronic device. For example, the host device 200 can be a laptop computer, a tablet computer, a desktop computer, etc. The host device 200 includes a host terminal 202. A remote device 204 can be coupled to the host device 200 via a plurality of data lanes. The remote device 204 can also be any electronic device and can include I/O ports for connecting I/O devices 206. For example, the remote device 204 can be a docking station, an I/O device hub, etc. The remote device 204 includes remote a terminal 208. The remote terminal 208 communicates with the host terminal 202 to allocate the data lanes to I/O protocols of the I/O devices 206. Communication between the remote terminal 208 and the host terminal 202 can be initiated by either the remote terminal 208 or the host terminal 202.

It is to be understood the block diagram of FIG. 2 is not intended to indicate that the computing system 200 is to include all of the components shown in FIG. 2 in every case. Further, any number of additional components can be included within the computing system 200, depending on the details of the specific implementation.

Figure 3:
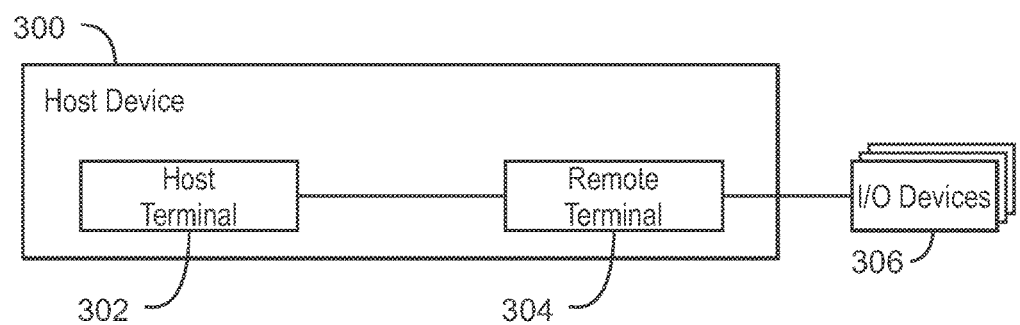
FIG. 3 is block diagram of an example of another computing system.

FIG. 3 is block diagram of an example of another computing system. The computing system includes a host device 300. The host device 300 includes a host terminal 302 coupled to a remote terminal 304. The host terminal 302 and the remote terminal 304 can be coupled via a plurality of data lanes. For example, the host terminal 302 can be coupled to the remote terminal 304 by a cable comprising a plurality of data lanes. Host device 300 can include a plurality of I/O ports to which I/O devices 306 can be connected. The remote terminal 304 is coupled to the I/O ports and detects connection of the I/O devices 306 to the host device 300. The host terminal 302 and the remote terminal 304 communicate to allocate the data lanes to I/O protocols of the I/O devices 306.

It is to be understood the block diagram of FIG. 3 is not intended to indicate that the computing system 300 is to include all of the components shown in FIG. 3 in every case. Further, any number of additional components can be included within the computing system 300, depending on the details of the specific implementation.

Figure 4:
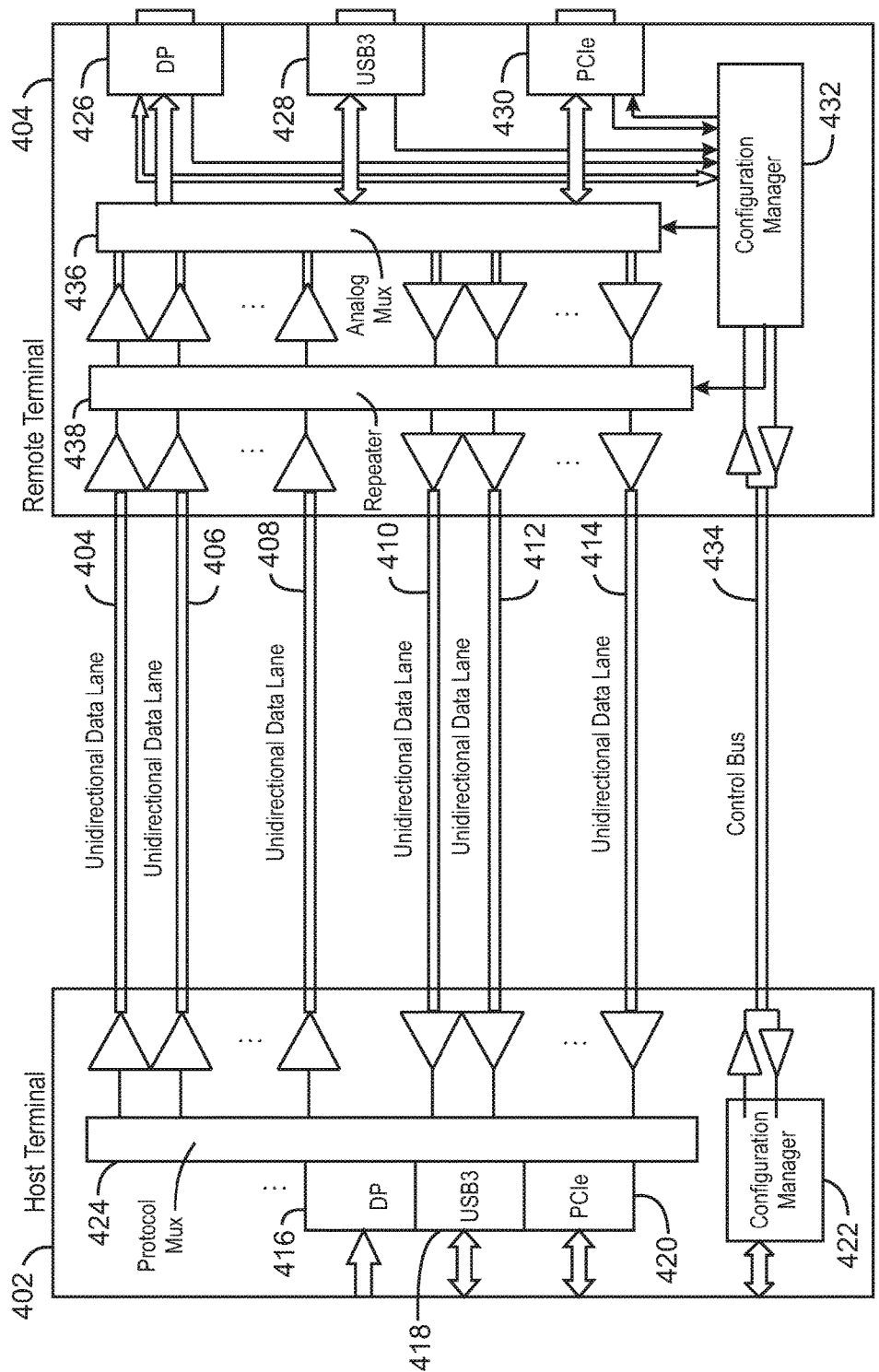
FIG. 4 is a block diagram of an example of a data lane multiplexing system.

FIG. 4 is a block diagram of an example of a data lane multiplexing system. The data lane multiplexing system 400 can be included in a computing system, such as the computing system illustrated in FIG. 1, FIG. 2, or FIG. 3. The data lane multiplexing system can include a host terminal 402 and a remote terminal 404. The host terminal 402 can be included in a host device such as electronic device 100, host device 200, or host device 300. The remote terminal 204 can be included in the host device, such as is illustrated by FIG. 3, or the remote terminal 204 can be included in a remote device separate from the host device 200, such as is illustrated in FIG. 2.

The host terminal 402 and the remote terminal 404 can be coupled via a data lane, or a plurality of data lanes, 404-414. For example, the host terminal 402 and the remote terminal 404 can be coupled by a cable including a plurality of wires, each wire acting as a data lane to transfer data. The data lanes 404-414 can be unidirectional data lanes that transfer data in only one direction, such as from the host terminal 402 to the remote terminal 404, or from the remote terminal 404 to the host terminal 402. The data lanes 404-414 can be any suitable type of data lanes, such as high-speed data lanes or low-speed data lanes. In another example, the data lanes 404-414 coupling the host terminal 402 to the remote terminal 404 can include a mixture of types of data lanes. For example, the data lanes 404-414 can include a mixture of high-speed data lanes and low-speed data lanes. The type of data lanes can be used during allocation of I/O protocols to the data lanes to determine which data lane(s) 404-414 are allocated to each I/O protocol.

The host terminal 402 can include a plurality of I/O protocol interfaces 416, 418, and 420. For example, the host terminal 402 can include a DisplayPort (DP) interface 416, a Universal Serial Bus 3.0 (USB3) interface 418, and a Peripheral Component Interconnect express (PCIe) interface 420. While the system 400 is shown as including DP, USB3, and PCIe interfaces, it is to be understood that the system 400 is not restricted to those interface and can include any type of I/O interface, as well as any combination of I/O interfaces.

The host terminal 402 can also include a host configuration manager 422. The host configuration manager 422 is to allocate the I/O protocols of the I/O devices to the data lanes. The host terminal 402 can additionally include a protocol multiplexer 424. The protocol multiplexer 424 can multiplex the signals on the data lanes based on the configuration of the data lanes by the host configuration manager 422. In other words, the protocol multiplexer 424 carries out the allocation of I/O protocols to the data lanes as determined by the host configuration manager 422.

The remote terminal 404 can include I/O ports for connecting I/O devices. For example, the I/O ports can include a DisplayPort 426, a USB3 port 428, and a PCIe port 430, among others. It is to be understood that the ports are not limited to the ports depicted in FIG. 4, but can include any type of I/O protocols that share similar electrical characteristics at the physical layer.

The remote terminal 404 also includes a remote configuration manager 432. The remote configuration manager 432 of the remote terminal 404 can communicate with the host configuration manager 422 of the host terminal 402. The remote configuration manager 432 and the host configuration manager 422 can communicate via a control bus 434. The control bus 434 can be any suitable type of link, such as a high speed link or a low-speed link, a uni-directional link or a bi-directional link. The remote configuration manager 432 detects the connection of an I/O device to an I/O port 426-430. When the remote configuration manager 432 detects the connection of an I/O device, the remote configuration manager 432 informs the host configuration manager 422. The host configuration manager 422 initializes and communicates with the remote configuration manager 432. The remote configuration manager 432 determines the capabilities of the connected I/O device, such as the data rate of which the I/O device is capable, and thus determine how many data lanes the I/O device uses to operate at a given data speed. The host configuration manager 422 can determine which applications will access the I/O device and the data speed at which the application will operate. The host configuration manager 422 and the remote configuration manager 432 will exchange the information and negotiate to allocate data lanes to the I/O protocol of the I/O device.

In an example, the remote terminal 404 can detect connection of multiple I/O devices. For example, the remote terminal 404 can detect connection of a DisplayPort device in the DisplayPort 426, and a USB device in the USB3 port 428. The remote configuration manager 432 communicates with the host configuration manager 422 to allocate data lanes to the I/O devices. For example, data lanes 404 and 410 can be allocated to the DP device and data lanes 406 and 412 can be allocated to the USB device. It is to be understood that the data lanes 404-414 can be allocated symmetrically or asymmetrically. For example, data lanes 404, 406, and 410 can be allocated to the DP device and data lanes 408 and 412 can be allocated to the USB device. Once data lanes 404-414 have been allocated to an I/O protocol, the I/O device can transfer data to the host device via the allocated data lanes 404-414.

The remote configuration manager 432 can also detect disconnection of a device from the I/O ports 426-430. For example, the remote configuration manager 432 can detect disconnection of the DP device. The remote configuration manager 432 will inform the host configuration manager 422 of the disconnection of the DP device. The host configuration manager 422 will de-allocate the data lanes allocated to the DP device and note the de-allocated data lanes as available resources, i.e., data lanes available for allocation. When a device is disconnected, any remaining connected devices will continue working without interruption. For example, when the DP device is disconnected, the USB device will continue without interruption.

The remote terminal can also include an analog multiplexer 436. Similar to the protocol multiplexer 424, the analog multiplexer carries out the switching function of the data lanes to the I/O protocols and determined by communication between the host configuration manager 422 and the remote configuration manager 422. A repeater 438 can be included in the remote terminal 404. The repeater 438 can preserve the electrical characteristics of the electrical signals being relayed.

It is to be understood the block diagram of FIG. 4 is not intended to indicate that the data lane multiplexing system 400 is to include all of the components shown in FIG. 4 in every case. Further, any number of additional components can be included within the data lane multiplexing system 400, depending on the details of the specific implementation.

Figure 5:
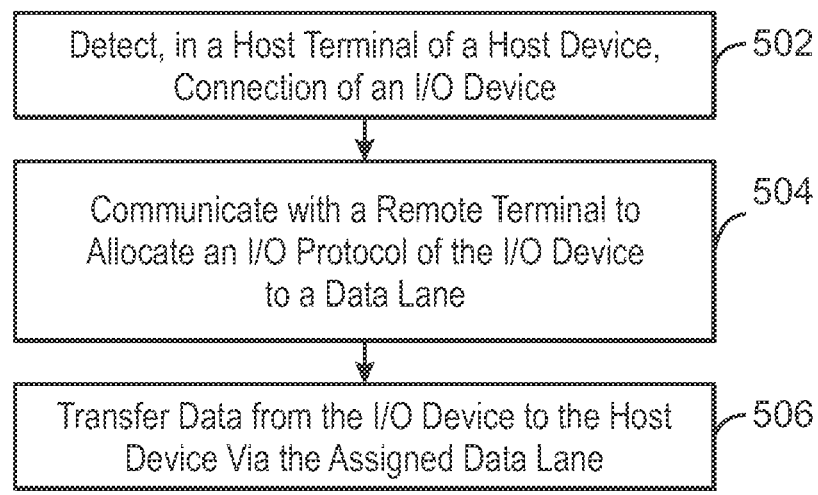
FIG. 5 is a process flow diagram of an example of a method of allocating an I/O protocol to a data lane.

FIG. 5 is a process flow diagram of an example of a method of allocating an I/O protocol to a data lane. The method 500 can be carried out by a lane multiplexing system, such as the data lane multiplexing system 400. At block 502, connection of an I/O device can be detected in a host terminal of a host device. The I/O device can be any type of I/O device, such as a USB device, a PCIe device, a DP device, or any other type of I/O device. Detection of connection of the I/O device can include detection by a remote terminal of the connection of the I/O device and informing the host terminal of the connection of the device. For example, a remote configuration manager, such as the remote configuration manager 432, can detect connection of the I/O device. The remote configuration manager 432 can communicate with a host configuration manager 422 to inform the host terminal of connection of the I/O device.

The I/O device can be coupled to an I/O port. The I/O port can be located in the host device or in a remote device. For example, the host device can be a laptop and the I/O device can be coupled to an I/O port of the laptop or the I/O device can be coupled to a remote device (e.g., USB3 hub) that is coupled to the laptop. The host device or remote device can include a single I/O port or multiple I/O ports. In an example, a single I/O device can be coupled to the host device or the remote device. In a further example, multiple I/O devices can be coupled to the host device or the remote device. The I/O ports can include a single type of I/O port or multiple types of I/O ports. For example, the I/O ports can include a USB3 port, a DP port, a PCIe port, a combination thereof, of any other type of I/O port.

At block 504, the host terminal can communicate with a remote terminal to allocate and I/O protocol of the connected I/O device to a data lane. The remote terminal can be included in the host device or the remote terminal can be included in a remote device. The remote terminal and the host terminal can be coupled by a plurality of data lanes for transferring data. The host terminal and the remote terminal can communicate via a bi-directional link. The host terminal and the remote terminal can exchange information regarding the capabilities of the I/O device and the data rate of the application(s) that will access the I/O device. Using this information, the host terminal and the remote terminal can allocate a data lane(s) to the I/O protocol of the I/O device. When multiple I/O devices are coupled to the I/O ports, the data lanes can be allocated to the I/O protocols of each of the I/O devices.

In order to allocate the data lanes, a host configuration manager of the host terminal can communicate with a remote configuration manager of the remote terminal. The host configuration manager and the remote configuration manager exchange the information and allocate the data lanes based on the information. The data lanes can be allocated symmetrically or asymmetrically. At block 506, data can be transferred from the I/O device to the host device via the assigned data lane(s).

It is to be understood the method of FIG. 5 is not intended to indicate that the method 500 is to include all of the components shown in FIG. 5 in every case. Further, any number of additional components can be included within the method 500, depending on the details of the specific implementation.

Figure 6:
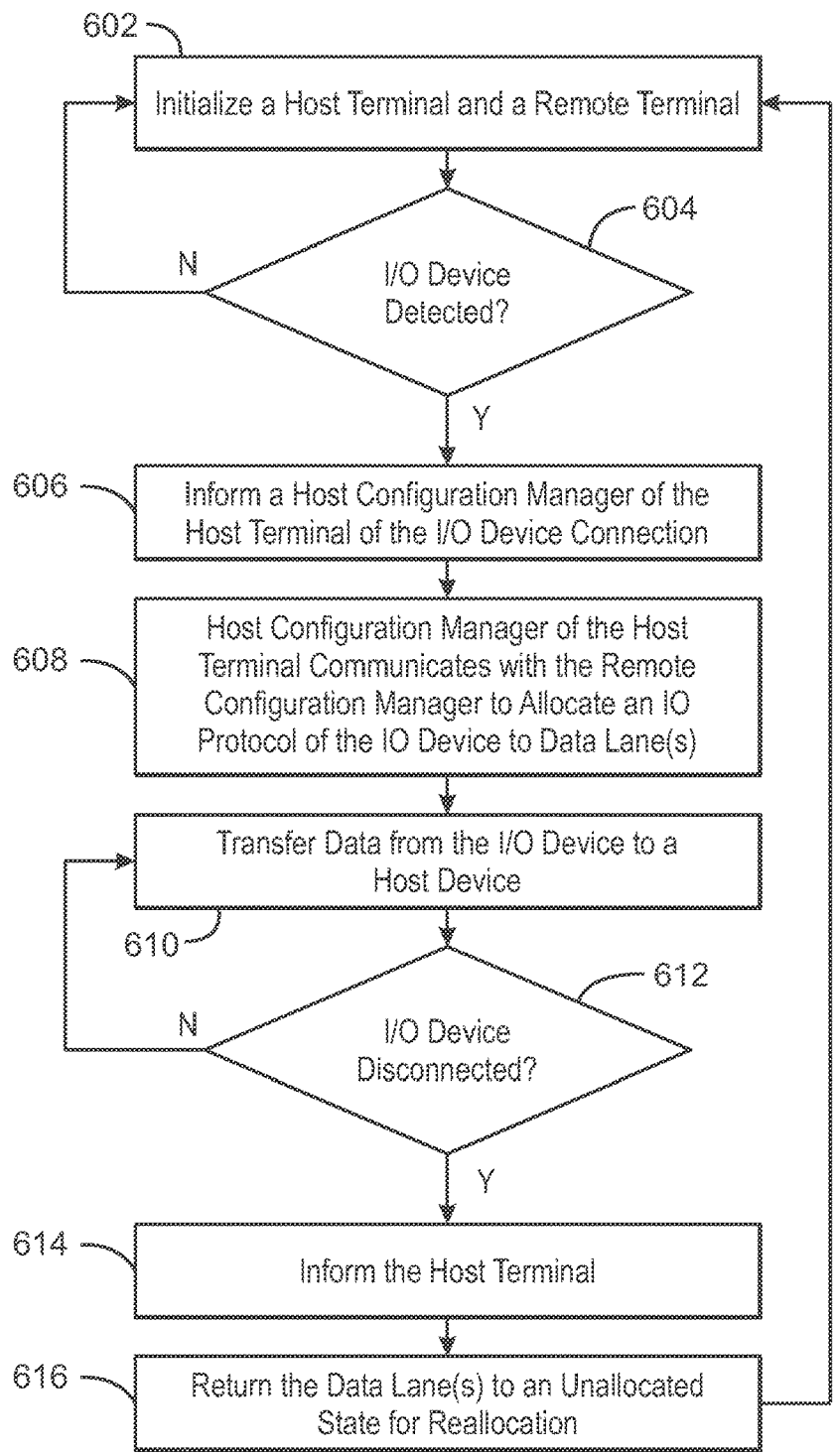
FIG. 6 is a process flow diagram of another example of a method of allocating an I/O protocol to a data lane.

FIG. 6 is a process flow diagram of another example of a method of allocating an I/O protocol to a data lane. The method 600 can be carried out by a lane multiplexing system, such as the data lane multiplexing system 400. At block 602, a host terminal and a remote terminal can be initialized. The host terminal can be included in a host device, such as host device 100, 200, or 300. The remote terminal can be included in a host device or in a remote device separate from the host device. The host terminal and the remote terminal can be coupled via a data lane, such as a plurality of data lanes, for transferring data between an I/O device and the host device.

At block 604, detection of an I/O device can be determined. Detection of an I/O device can be performed by the remote terminal. The remote terminal can detect connection of an I/O device to an I/O port. The I/O device can be any type of I/O device. If no I/O device is detected, the method can return to block 602. If an I/O device is detected, the remote terminal can inform the host terminal of the connection of the I/O device at block 606. In particular, a remote configuration manager of the remote terminal can inform the host configuration manger of the host device of the I/O device connection.

At block 608, the host configuration manager of the host terminal can communicate with the remote configuration manager to allocate an I/O protocol of the I/O device to a data lane(s). The remote configuration manager and the host configuration manager can exchange information regarding the capabilities of the I/O device and data rate to support an application accessing the I/O device. Using the information, the remote configuration manager and the host configuration manager allocate data lanes to the I/O protocol of the I/O device. In an example, multiple I/O devices can be coupled to I/O ports. The I/O devices can each include a different I/O protocol. Data lanes can be allocated to each I/O protocol of the coupled I/O devices.

At block 610, data can be transferred from the I/O device to the host device via the allocated data lane(s). At block 612, disconnection of the I/O device can be determined. For example, the remote configuration manager can determine if an I/O device has been disconnected. If the I/O device has not been disconnected, the method can return to block 610. If the I/O device has been disconnected, the remote terminal can inform the host terminal of the disconnection of the I/O device at block 614. At block 616, the host configuration manager can return the data lane(s) allocated to the disconnected I/O device to an unallocated (i.e., available) status for reallocation. The method can return to block 602.

It is to be understood the method of FIG. 6 is not intended to indicate that the method 600 is to include all of the components shown in FIG. 6 in every case. Further, any number of additional components can be included in the method 600, depending on the details of the specific implementation.

Example 1

A system is described herein. The system includes a host device. The host device includes a host configuration manager to allocate a data lane to an I/O protocol and a protocol multiplexer to carry out allocation of the data lane based on the allocation of the configuration manager. The system also includes a remote terminal including a remote configuration manager. The host configuration manager is to communicate with the remote configuration manager via a control bus to detect connection of an I/O device to an I/O port and to allocate the data lane to the I/O protocol.

The control bus can include a uni-directional communication link or a bi-directional communication link and the data lane can include a uni-directional data lane or a bi-directional data lane. The data lane can include a plurality of data lanes and multiple I/O devices coupled to I/O ports and data lanes can be allocated to I/O protocols of the I/O devices. The data lane can include a plurality of unidirectional data lanes and the data lanes can be allocated symmetrically or asymmetrically. The host configuration manager can be to communicate with a remote configuration manager of a remote terminal to assign the data lane to the I/O protocol. The host configuration manager can be to allocate data lanes based on I/O device capability information, the information to be communicated to the host configuration manager by the remote configuration manager. The host device can include the remote terminal or a remote device can include the remote terminal.

Example 2

A host terminal of a host electronic device is described herein. The host terminal includes a host configuration manager to allocate a data lane to an I/O protocol when an I/O device is coupled to an I/O port. The host terminal also includes a protocol multiplexer to carry out allocation of the data lane to the I/O protocol as determined by the host configuration manager.

The data lane can include a plurality of data lanes and the data lanes can be allocated symmetrically or asymmetrically. The data lane can include a uni-directional data lane or a bi-directional data lane. The host configuration manager can be to communicate with a remote configuration manager of a remote terminal via a control bus to assign the data lane to the I/O protocol. The control bus can include a uni-directional link or a bi-directional link. The host device can include the remote terminal or a remote device can include the remote terminal. The data lane can transfer data between the I/O device and the host device. The data lane can include a plurality of data lanes and multiple I/O devices can be coupled to I/O ports and data lanes can be allocated to each I/O protocol of the I/O devices. The host configuration manager can be to allocate data lanes based on I/O device capability information, the information to be communicated to the host configuration manager by a remote configuration manager of a remote terminal.

Example 3

A computing system is described herein. The computing system includes logic to detect, in a host terminal of a host device, connection of an I/O device. The computing system also includes logic to communicate with a remote terminal to allocate a data lane to an I/O protocol and logic to transfer data from the I/O device to the host device via the allocated data lane.

The computing system of can also include logic to detect, in a remote terminal, connection of an I/O device to an I/O port and logic to inform the host terminal of the connection of the I/O device. A remote configuration manager of the remote terminal can communicate with a host configuration manager of the host terminal via a bi-directional link. The host terminal and the remote terminal can be coupled by a plurality of data lanes. The data lanes can include uni-directional data lanes. The computing system can also include logic to detect disconnection of the I/O device from the I/O port and logic to return the data lane to an unallocated state to be allocated to a new I/O protocol. Connection of an I/O device can include connection of the I/O device to an I/O port of the host device or connection of the I/O device to an I/O port of a remote device coupled to the host device.

Example 4

A computing system is described herein. The computing system includes logic to detect, in a remote terminal of an electronic device, disconnection of an I/O device from an I/O port and logic to return a data lane assigned to an I/O protocol of the I/O device to a de-allocated state available for allocation to a new protocol. The computing system also includes logic to detect connection of a new I/O device to an I/O port and logic to communicate with a host terminal to allocate a data lane to an I/O protocol of the new I/O device. The computing system further includes logic to transfer data between the new I/O device and a host device via the data lane.

A plurality of I/O devices can be coupled to I/O ports and disconnection of the I/O device from the I/O port does not interrupt operation of remaining I/O devices coupled to I/O ports. The new protocol can be the same protocol as a previous protocol or the new protocol can be different from the previous protocol.

In the foregoing description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A system, comprising:
   a remote terminal comprising:
      a first port associated with a first Input/Output (I/O) protocol;
      a second port associated with a second I/O protocol; and
      a remote configuration manager configured to detect device connection at the first port and the second port;
   a host terminal comprising:
      a plurality of data lanes coupling the host terminal to the remote terminal;
      a first I/O interface configured to operate at the first I/O protocol;
      a second I/O interface configured to operate at the second I/O protocol;

a host configuration manager to allocate the plurality of data lanes to one or more I/O protocols based on the device connections detected at the first port and the second port; and
a protocol multiplexer to carry out allocation of the plurality of data lanes based on the allocation of the host configuration manager, wherein the protocol multiplexer couples a first data lane of the plurality of data lanes to the first I/O interface if device connection is detected at the first port and the protocol multiplexer couples a second data lane of the plurality of data lanes to the second I/O interface if device connection is detected at the second port; and
the host configuration manager to communicate with the remote configuration manager via a control bus to receive device connection information from the remote terminal.

2. The system of claim 1, wherein the control bus comprises a uni-directional communication link or a bi-directional communication link and wherein the plurality of data lanes comprise uni-directional data lanes.

3. The system of claim 1, wherein multiple I/O devices are coupled to the I/O ports of the remote terminal and wherein the plurality of data lanes are allocated to corresponding I/O protocols of the respective I/O devices.

4. The system of claim 1, wherein the plurality of data lanes are unidirectional and are allocated symmetrically.

5. The system of claim 1, wherein the host configuration manager is to allocate data lanes based on I/O device capability information, the information to be communicated to the host configuration manager by the remote configuration manager.

6. The system of claim 1, wherein the remote terminal and the host terminal are included in a same device.

7. A host terminal of a host electronic device, comprising:
a plurality of data lanes coupling the host terminal to a remote terminal, wherein the remote terminal comprises:
a first port associated with a first Input/Output (I/O) protocol;
a second port associated with a second I/O protocol; and
a remote configuration manager configured to detect device connection at the first port and the second port;
a first I/O interface configured to operate at the first I/O protocol;
a second I/O interface configured to operate at the second I/O protocol;
a host configuration manager to allocate the plurality of data lanes to one or more I/O protocols based on the device connections detected at the first port and the second port; and
a protocol multiplexer to carry out allocation of the plurality of data lanes as determined by the host configuration manager, wherein the protocol multiplexer couples a first data lane of the plurality of data lanes to the first I/O interface if device connection is detected at the first port and the protocol multiplexer couples a second data lane of the plurality of data lanes to the second I/O interface if device connection is detected at the second port.

8. The host terminal of claim 7, wherein the plurality of data lanes are allocated symmetrically or asymmetrically.

9. The host terminal of claim 8, wherein the plurality of data lanes comprise uni-directional data lanes.

10. The host terminal of claim 7, wherein the host configuration manager is to communicate with the remote configuration manager of the remote terminal via a control bus to allocate the plurality of data lanes.

11. The host terminal of claim 10, wherein the control bus comprises a bi-directional link.

12. The host terminal claim 10, wherein the host electronic device comprises the remote terminal.

13. The host terminal of claim 7, wherein the host configuration manager is to allocate data lanes based on I/O device capability information, the information to be communicated to the host configuration manager by the remote configuration manager of the remote terminal.

14. A computing system, comprising:
logic, in a host terminal of a host device, to detect connection of an first I/O device at a first port of a remote terminal and detect connection of an second I/O device at a second port of the remote terminal, wherein the first port is associated with a first I/O protocol and the second port is associated with a second I/O protocol;
logic to communicate with the remote terminal to allocate a plurality of data lanes to one or more I/O protocols depending on the detected connections, wherein a first data lane of the plurality of data lanes is coupled to a first I/O interface configured to use the first I/O protocol if the first I/O device is detected at the first port and a second data lane of the plurality of data lanes is coupled to a second I/O interface configured to use the second I/O protocol if the second I/O device is detected at the second port; and
logic to transfer data from the first I/O device to the host device via the first data lane and transfer data from the second I/O device to the host device via the second data lane.

15. The computing system of claim 14, further comprising:
logic to detect, in the remote terminal, connection of the first I/O device to the first port of the remote terminal; and
logic to inform the host terminal of the connection of the first I/O device.

16. The computing system of claim 14, wherein a remote configuration manager of the remote terminal communicates with a host configuration manager of the host terminal via a bi-directional link.

17. The computing system of claim 14, wherein the plurality of data lanes comprise unidirectional data lanes.

18. The computing system of claim 14, further comprising:
logic to detect disconnection of the first I/O device from the first port; and
logic to return the first data lane to an unallocated state to be allocated to a new I/O protocol.

* * * * *